(12) United States Patent
Ciesielczyk et al.

(10) Patent No.: US 12,187,428 B2
(45) Date of Patent: Jan. 7, 2025

(54) DRONE INSTALLED HARDWARE

(71) Applicant: PREFORMED LINE PRODUCTS CO., Mayfield Village, OH (US)

(72) Inventors: Benjamin Franklin Ciesielczyk, Madison, OH (US); Douglas Bell, Mayfield Heights, OH (US); John Markiewicz, Mentor, OH (US)

(73) Assignee: PREFORMED LINE PRODUCTS CO., Mayfield Village, OH (US)

( * ) Notice: Subject to any disclaimer, the term of this patent is extended or adjusted under 35 U.S.C. 154(b) by 0 days.

(21) Appl. No.: 17/964,812

(22) Filed: Oct. 12, 2022

(65) Prior Publication Data

US 2023/0114499 A1   Apr. 13, 2023

Related U.S. Application Data

(60) Provisional application No. 63/254,761, filed on Oct. 12, 2021.

(51) Int. Cl.
*H02G 1/02* (2006.01)
*B23P 19/06* (2006.01)
*B64C 39/02* (2023.01)
*F16B 9/02* (2006.01)
*H02G 7/12* (2006.01)
(Continued)

(52) U.S. Cl.
CPC ............ *B64C 39/024* (2013.01); *B23P 19/06* (2013.01); *F16B 9/02* (2013.01); *H02G 1/02* (2013.01); *H02G 7/12* (2013.01); *B64U 10/13* (2023.01); *B64U 2101/00* (2023.01); *B64U 2201/10* (2023.01)

(58) Field of Classification Search
CPC .. B23P 19/06; F16B 9/02; H02G 1/02; H02G 7/12; B64U 10/13; B64U 2101/00; B64U 2201/10
See application file for complete search history.

(56) References Cited

U.S. PATENT DOCUMENTS

2015/0314434 A1*  11/2015  Bevins, Jr. ............... H02G 1/02
                                                              408/124
2016/0023761 A1    1/2016  McNally
(Continued)

FOREIGN PATENT DOCUMENTS

EP    3319190 A1    5/2018
WO   2020159384 A1    8/2020

OTHER PUBLICATIONS

"Rotamarka Installation Options Including Drone!", Jun. 17, 2021; URL:https://www.youtube.com/watch v=7JDrOEY47X8XP093018248; pp. 1,2,6-11,15,16; See the video passage following 1:05 showing the installation by drone and see the video passage following 1:41 showing the installation from a helicopter with a hand held screw drive.

(Continued)

*Primary Examiner* — Lee A Holly
(74) *Attorney, Agent, or Firm* — Cooper Legal Group, LLC

(57) ABSTRACT

One or more arrangements and associated methods for mechanical installation of an item at a location on a line that is suspended are provided. An arrangement includes a portion for mechanical actuation to install the item upon the line at the location. The arrangement includes a flying drone portion for levitation of the portion to the location on the line.

20 Claims, 14 Drawing Sheets

(51) Int. Cl.
*B64U 10/13* (2023.01)
*B64U 101/00* (2023.01)

(56) References Cited

U.S. PATENT DOCUMENTS

| | | | |
|---|---|---|---|
| 2018/0215459 A1* | 8/2018 | Busby, Jr. | B64C 39/024 |
| 2020/0295476 A1* | 9/2020 | O'Connell | H01R 4/4863 |
| 2021/0013705 A1* | 1/2021 | Miron | H02G 1/02 |
| 2021/0299845 A1* | 9/2021 | Frenken | B64C 39/024 |
| 2021/0370500 A1* | 12/2021 | Liu | F16H 57/039 |
| 2021/0399541 A1* | 12/2021 | Johansen | H02G 7/12 |
| 2022/0367135 A1* | 11/2022 | Gray | H01H 50/54 |
| 2023/0072185 A1* | 3/2023 | Clarke | H02G 1/02 |
| 2023/0109707 A1* | 4/2023 | Bell | B64C 39/024 |
| | | | 700/245 |
| 2023/0116365 A1* | 4/2023 | Ciesielczyk | B23P 19/06 |
| | | | 174/146 |

OTHER PUBLICATIONS

International Search Report of Corresponding Application No. PCT/US2022/046476; 3 Pgs.; Feb. 6, 2023.

* cited by examiner

DRONE INSTALLED HARDWARE

RELATED APPLICATION(S)

This application claims priority to provisional applications U.S. 63/254,761, filed on Oct. 12, 2021, entitled "ROBOT INSTALLED POWER LINE HARDWARE", U.S. 63/254,763, filed on Oct. 12, 2021, entitled "DRONE INSTALLED BOLTED HARDWARE", U.S. 63/254,767, filed on Oct. 12, 2021, entitled "TWIN SPACER DRONE INSTALL SYSTEM", U.S. 63/254,774, filed on Oct. 12, 2021, entitled "SPACER END CLAMP", all of which are incorporated by reference herein in their entirety.

TECHNICAL FIELD

The present disclosure relates generally to in situ work upon utility lines, such as power/communication lines (e.g., a power transmission line). In an example, the present disclosure relates to in situ installation of hardware equipment onto a utility line.

BACKGROUND

Many power/communication lines extend in a suspended manner, in air, by towers, poles or the line. In situ (i.e., in place) work upon such a power/communication line thus involves work at location(s) spaced up and away from terrain (i.e., spaced up and away from ground, building(s), water or the like).

In situ work upon such a power/communication line may be performed by one or more linemen, generally line technicians, possibly with the aid of hot stick(s) for safety. Performance of work by a line technician often includes placing the line technician within a working distance of the power/communication line upon which work is performed. Such placement of a line technician within a working distance of a power/communication line may include the use of a ladder, a lift apparatus (e.g., a bucket truck), a helicopter, or similar.

Working along an extended length of such a power/communication line may include a need to move/reposition the device (e.g., ladder, lift apparatus, helicopter, or similar) used to place the line technician within a working distance of the power/communication line.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In accordance with an aspect, the present disclosure provides an arrangement for mechanical installation of an item at a location on a line. The arrangement includes a portion for mechanical actuation to install the item upon the line at the location. The arrangement includes a flying drone portion for levitation of the portion to the location on the line.

In accordance with an aspect, the present disclosure provides a method of mechanical installation of an item at a location on a line. The method includes flying an arrangement, via operation of a drone portion of the arrangement, to levitate the arrangement to the location on the line. The method includes actuating a bolt, via operation of a mechanical actuation portion of the arrangement, to install an item upon the line at the location.

In accordance with an aspect, the present disclosure provides an arrangement for installation of an item at a location on a line. The arrangement includes a portion for actuating a clamp to install the item upon the line at the location. The arrangement includes a flying drone portion for levitation of the portion to the location on the line.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Figure 1:
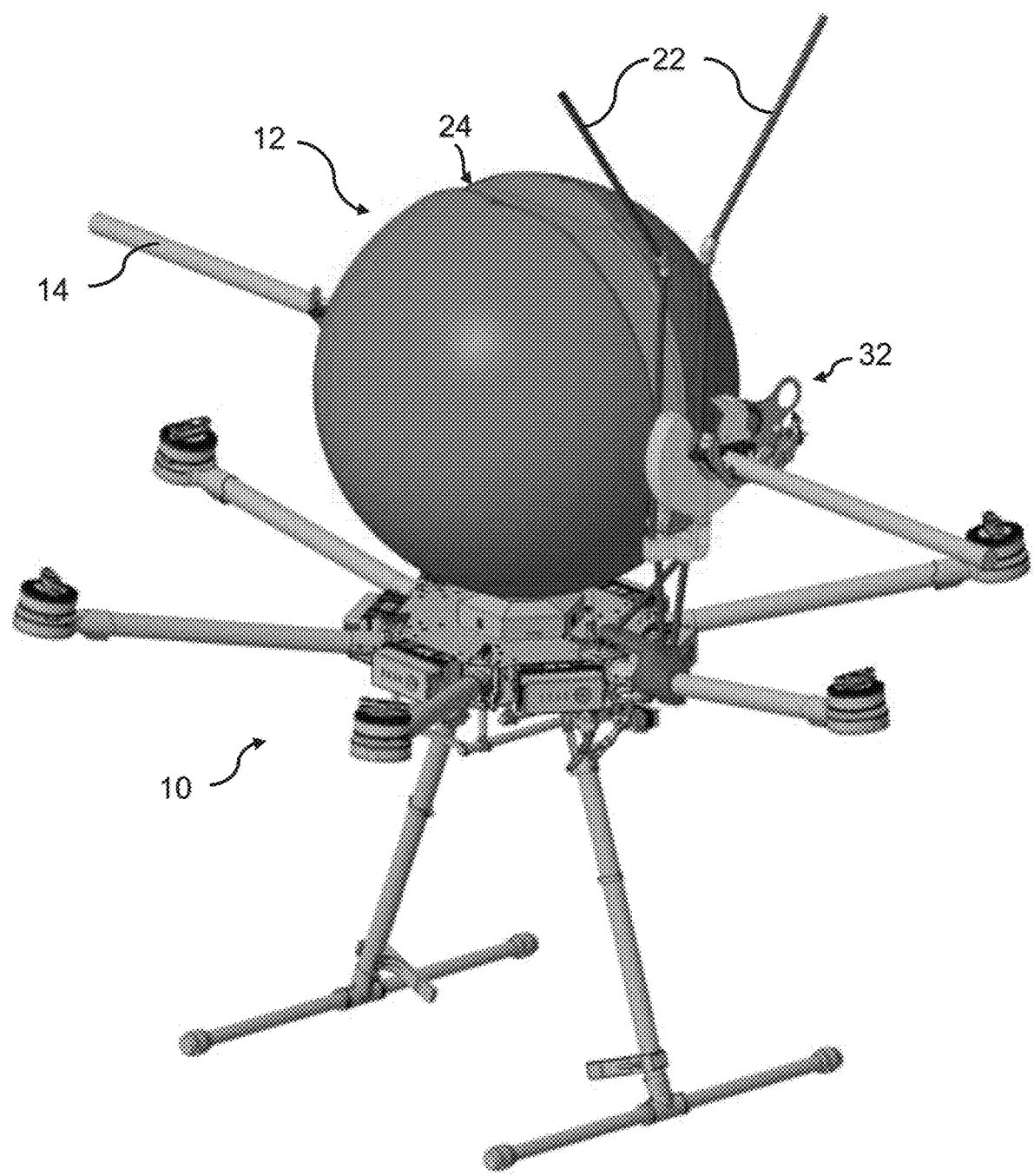
FIG. 1 is an illustration of an arrangement, including a drone, for installation of an example item at a location on a suspended line in accordance with at least one aspect of the present disclosure.

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

Certain terminology is used herein for convenience only and is not to be taken as a limitation on the disclosed subject matter. Relative language used herein is best understood with reference to the drawings, in which like numerals are used to identify like or similar items. Further, in the drawings, certain features may be shown in somewhat schematic form. The drawing sheets, and content contained thereon, are incorporated into this specification, and thus the patent application, by reference.

The following subject matter may be embodied in a variety of different forms, such as methods, devices, components, and/or systems. Accordingly, this subject matter is not intended to be construed as limited to any illustrative embodiments set forth herein as examples. Rather, the embodiments are provided herein merely to be illustrative.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

Herein the term line is to be accorded a broad interpretation. The line may be a cable and/or the like. The line may include metal (e.g., copper, aluminum or the like) or other materials (e.g., fiber). Also, the line may be for transmission of electrical energy, transmission of communications or other functions. The line is suspended in air, typically at a height that increases challenge of accessing the line and extends for an expanse that increases challenge of accessing the line. The line may generally be considered a utility line. Such includes a transmission line and/or similar (e.g., suspended by utility pole, etc.).

In accordance with an aspect, the present disclosure provides an arrangement for mechanical installation (e.g., securing) of an item at a location on a suspended line. The arrangement includes a flying drone portion for levitation of the arrangement to the location on the line. The arrangement includes a portion for mechanical actuation to install an item upon the line. Also, the present disclosure provides a method of bolting installation at a location on a suspended line. The method includes flying an arrangement, via operation of a drone portion of the arrangement, to levitate the arrangement to the location on the line. The method includes mechanical actuation, via operation of an actuation portion of the arrangement, to install an item upon the line. Further, in accordance with an aspect, the present disclosure provides an arrangement for installation at a location on a suspended line. The arrangement includes a flying drone portion for levitation of the arrangement to the location on the line. The arrangement includes a portion for actuating a clamp to install an item upon the line. Further, in accordance with an aspect, the present disclosure provides a method of installation at a location on a suspended line. The method includes flying an arrangement, via operation of a drone portion of the arrangement, to levitate the arrangement to the location on the line. The method includes actuating a clamp to install an item upon the line.

Many types of hardware are installed (e.g., placed, located, secured, affixed, etc.) onto power, telephone, and fiber-utility lines using bolted connections. Typically, these bolted connections require direct connection from a line worker (e.g., a lineman or line technician) in order to be installed. The line technician may need to climb a pole to position the device and tighten the bolted connection. The line technician may also use a hot stick or other device that enables them to install the hardware from a distance while still maintain a direct connection to the hardware. A line technician may also be lifted with a helicopter, or work out of a bucket truck when installing hardware. All of these methods require a direct connection between the line technician and the hardware being installed. All of these methods are physically demanding and include several safety risks to the line technician and the line itself.

Examples of items/products installed with these methods include bundled line/conductor spacers, vibration dampers, bird and wildlife diverters, markerballs, and line monitoring equipment. These methods of installation always carry same amount of risk for the line technician due to the heights at which they are working. These methods can also get very expensive depending on the location and ease of access of the line.

In accordance with at least one aspect of the present disclosure, a drone may be used to lift hardware up to a powerline for installation. The drone may have a mechanism to tighten or otherwise fasten a bolted or other style attachment fastener to install the hardware to a line. The drone may also have a means to locate the hardware and position it at a specific location along the powerline depending on the application. It may be capable of installing multiple hardware pieces per flight. Following is provided some more detailed descriptions of various products that would be ideal for drone installations.

Many types of hardware can be installed on a line using a drone. Bundled line/conductor spacers are one type of hardware that would benefit from drone installations. A drone based installation system would consist of a mechanism to hold the spacer, a way to set the correct line spacing if installing on new construction lines, a way to guide the line into the spacer clamping areas, a way to tighten the spacer attachment bolt or activate other attachment methods, a way to release the spacer once installed on the line, some system that allows correct positioning of the spacer with respect to the line and towers, and a prop guard system to protect the drone as the installation is performed. Most of these drone features will need to be able to be remotely activated so that the pilot has control of these operations from the ground. Some of them could also be automated so that the spacer is installed automatically once the drone is in the correct position. The drone could also be capable of holding multiple spacers at once to increase the efficiency of the installation operation.

Another type of hardware that could be installed using a drone would be a vibration damper. Similar to the spacers mentioned above, these dampers are typically attached to a line using a bolted or other style clamp connection. A drone-based installation system would consist of a mechanism to hold the damper, a way to guide the line into the damper clamping area, a way to tighten the damper attachment bolt or activate other attachment methods, a way to release the damper once installed on the line, some system that allows correct positioning of the damper with respect to the line and towers, and a prop guard system to protect the drone as the installation is performed. Most of these drone features will need to be able to be remotely activated so that the pilot has control of these operations from the ground. Some of them could also be automated so that the damper is installed automatically once the drone is in the correct position. The drone could also be capable of holding multiple dampers at once to increase the efficiency of the installation operation.

Another type of hardware item that could be installed using a drone would be a line markerball. Similar to the spacers mentioned above, these markerballs are typically attached to a line using a bolted or other style clamp connection. A drone-based installation system would consist of a mechanism to hold the markerball, a way to guide the line into the markerball clamping area, a way to tighten the markerball attachment bolt or activate other attachment methods, a way to release the markerball once installed on the line, some system that allows correct positioning of the markerball with respect to the line and towers, and a prop guard system to protect the drone as the installation is performed.

Most of these drone features will need to be able to be remotely activated so that the pilot has control of these operations from the ground. Some of them could also be automated so that the markerball is installed automatically once the drone is in the correct position. The drone could also be capable of holding multiple markerballs at once to increase the efficiency of the installation operation.

Figure 2:
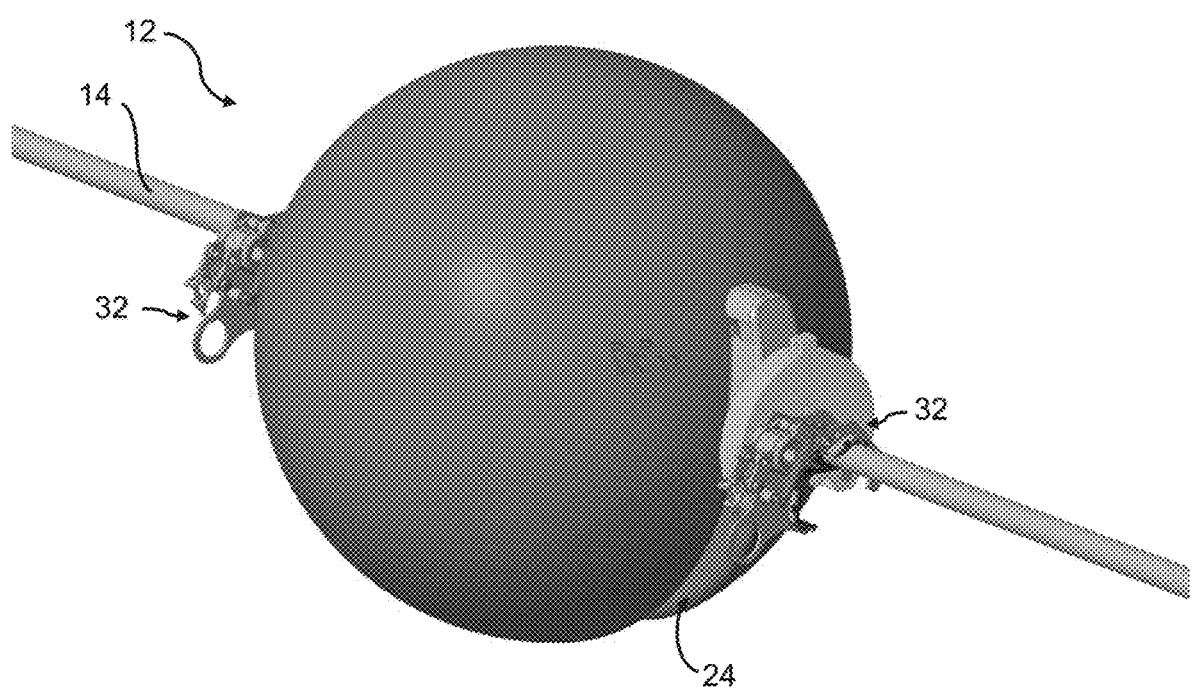
FIG. 2 is an enlarged, rotated/inverted, illustration of an example item and shows an example rotating auto-clamp mechanism to install the example item on the line in accordance with at least one aspect of the present disclosure.
Figure 3:
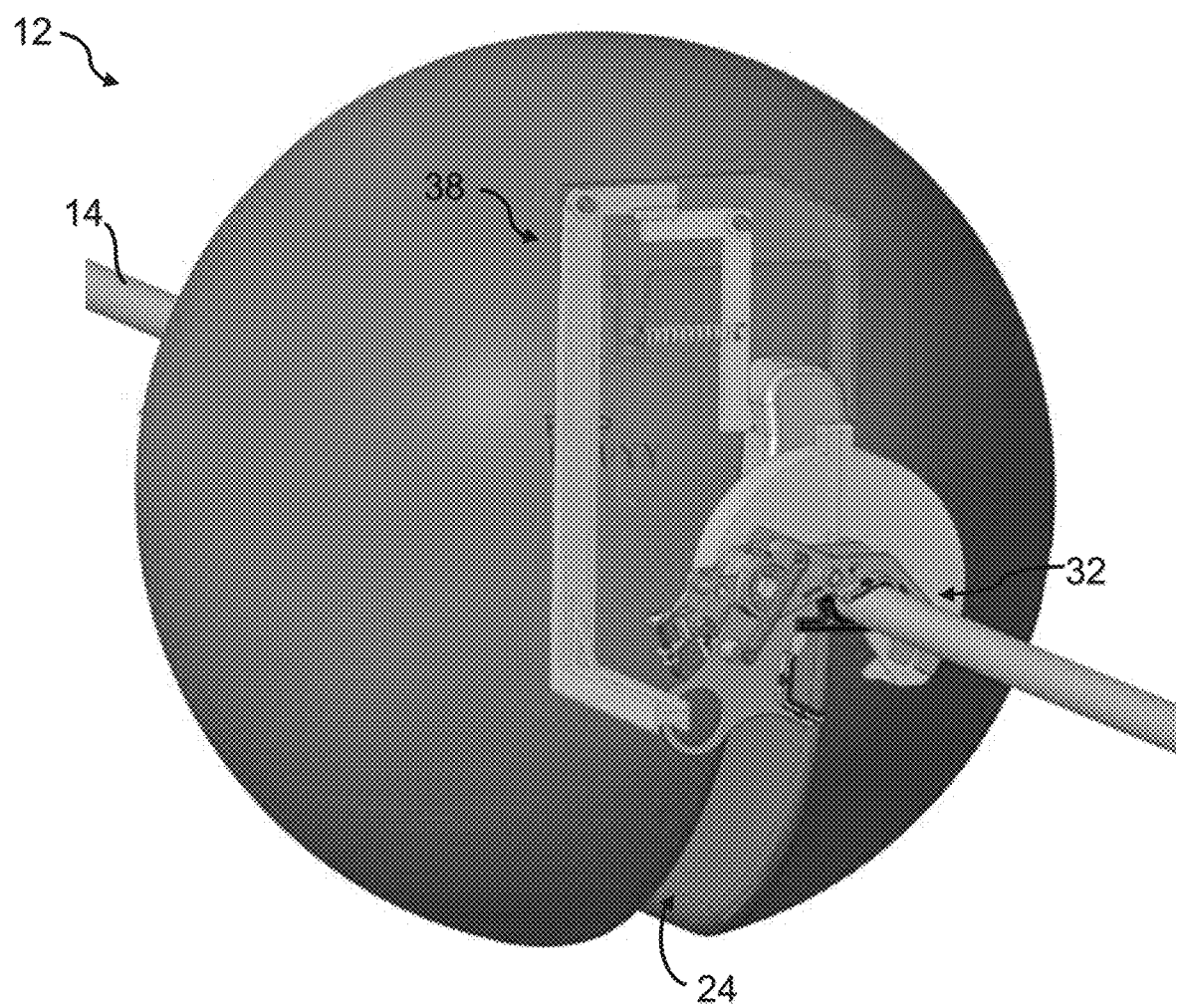
FIG. 3 is an illustration similar to FIG. 2 and shows a schematic representation of an example drone-based latch/release actuation mechanism for the example rotating auto-clamp mechanism of FIG. 2 in accordance with at least one aspect of the present disclosure.

FIG. 1 shows an example drone system 10 for an example drone-installed markerball 12. The markerball 12 is one example of an item that is to be installed upon a line 14. Moreover, FIGS. 2 and 3 illustrate examples of an installation method of the markerball 12 and associated hardware. It is to be noted that FIGS. 2 and 3 show the markerball 12 inverted as compared to the view of FIG. 1. Such inversion helps to show structures associated within installing/securing the markerball 12 onto the line 14.

It is to be appreciated that the drone system 10 (FIG. 1) is just one example and that variations of the drone system are contemplated and within the scope of the present disclosure. It is to be appreciated that the markerball 12 is just one example of an item that is to be installed upon the line 14 and that various items to be installed upon the line are contemplated and within the scope of the present disclosure. The installation method examples indicated via FIGS. 2 and 3 are just some examples and that various methods are contemplated and within the scope of the present disclosure.

Focusing upon FIG. 1, the drone system 10 has one or more propellers (not shown to reduce clutter) to provide lift to the drone system. The item that is to be installed upon the line 14 (i.e., the markerball 12) is installed to the drone system 10 for the transport (e.g., lift) to the line 14. Within the shown example of FIG. 1, the markerball 12 is installed to the top of the drone system 10. However, it is to be appreciated that the markerball 12, and generally items to be installed upon the line, may be installed at a different location on the drone system 10. It is to be appreciated that the drone system 10 may have a construction/configuration for such different location on the drone system 10.

It is to be appreciated that the securing of the markerball 12, and generally other, upon the line 14 occurs at a remote location from a line technician. As such, in accordance with at least one aspect of the present disclosure, the aspects of final placement onto the line 14 and securing to the line include one or more aspects of being autonomous, automatic, remotely-controlled or a combination thereof.

The shown example of the drone system 10 of FIG. 1 includes one or more extending fingers (e.g., a guide rod/support system) 22 at an upper portion of the drone system 10 to help guide the drone system to a desired location relative to the line 14. Such guidance helps the drone system 10 to be at least partially autonomous/automatic concerning achieving a desired location. Such autonomous/automatic locating is useful in connection with the particulars of the markerball 12. Specifically, the markerball 12 has a slot 24 extending from a center bisection line and radially outward from the bisection line. Such slot allows the line 14 to be located at the center bisection line of the markerball 12. It is to be noted that markerball 12 is installed upon the drone system 10 such that the slot 24 is aligned within the extending fingers/rods 22. The extending fingers/rods 22 help guide the line 14 into the slot as the drone system 10 moves the markerball 12 to the desired location on the line. In part, gravity may help hold the markerball 12 in position upon the drone system 10, and the drone system and the markerball would be flown up to the line 14.

Focusing upon FIG. 2, it is to be noted that the markerball 12 may include clamps 32 for encircling and/or gripping the line 14. Once the markerball 12 in in place upon the line, the clamps 32 can be actuated. It is to be appreciated that the clamps may be constructed/configured as auto clamps (e.g., they close as the markerball 12 is brought into place upon the line 14). The drone system 10 and the markerball 12 would be flown up to the line 14 until the clamps engage. Then as the drone system 10 is lowered the markerball 12 is held in place and drone system moves (e.g., downwardly) away from the held markerball. Building on this, the attachment clamps 32 could be attached to the markerball 12 with an attachment method that would allow the markerball to rotate, as shown in FIG. 2, on the line 14 while the clamps 32 remain stationary to help protect the clamp and line during high wind events.

The drone system 10 may include one or more structures that are constructed/configured to close (i.e., operate) or otherwise install the clamps 32. FIG. 3 shows one schematic example of a drone-based structure 38 to actuate auto-clamp actuation. Recall that FIG. 3 is an inverted view as compared to FIG. 1. Of course, it is to be appreciated that FIG. 3 shows just one example of structure to close (i.e., operate) or otherwise install the clamps 32 and that variations are contemplated and within the scope of the present disclosure.

Figure 4:
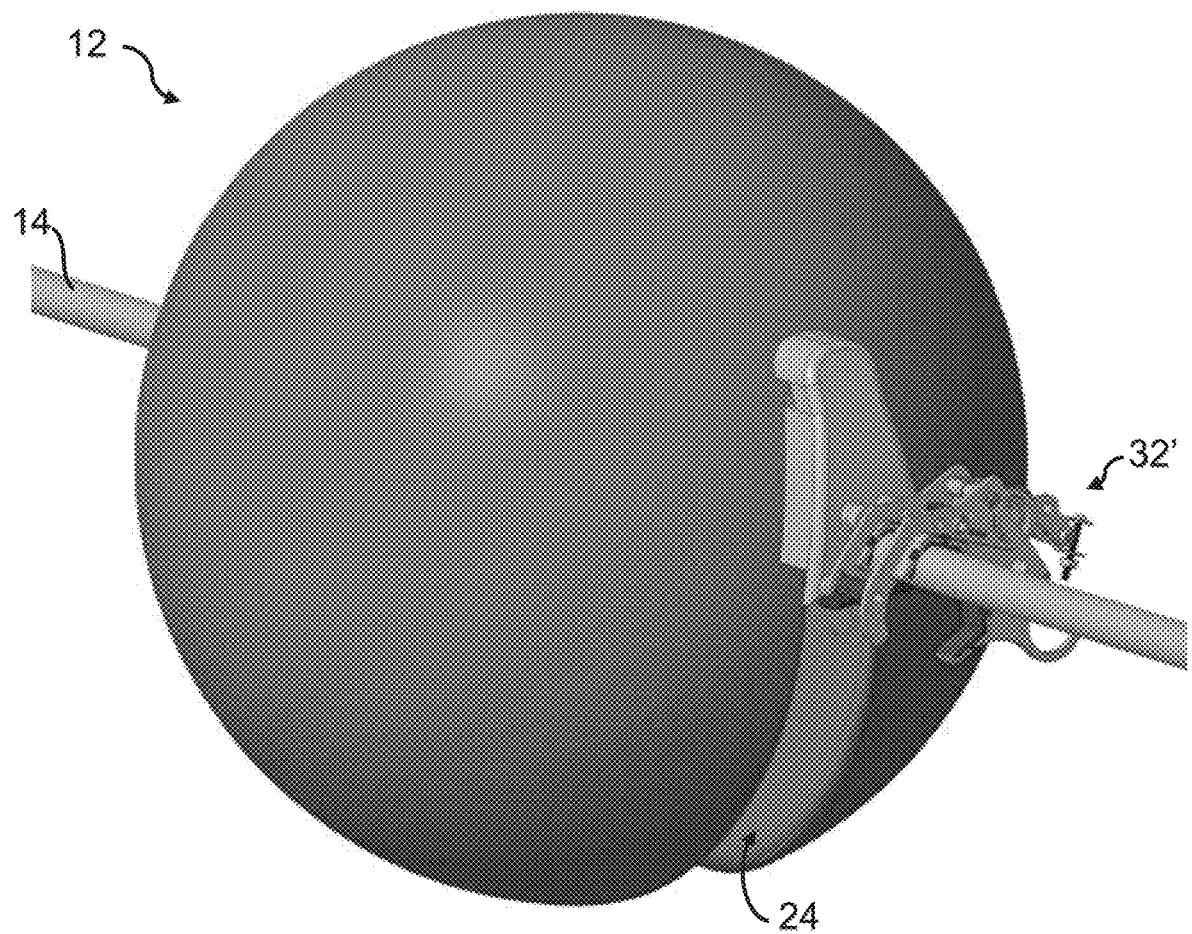
FIG. 4 is an illustration similar to FIG. 2, but shows a fixed auto-clamp mechanism in accordance with at least one aspect of the present disclosure.

As mentioned, variants of the markerball 12 and the clamps 32 are within the scope of the present disclosure. For example, FIG. 4 shows a markerball attachment concept that has an automatic raptor clamp 32' attachment method. The slot 24 in the markerball 12 may help guide the line 14 into interface the clamp 32'. According to some example embodiments, a spring-based clamp is "set" while the markerball 12 is on the "ground" (e.g., with the line technician on the ground, a building or the like, and prior to being elevated to the installation location upon the suspended line 14) and then the spring-based clamp 32' automatically closes (e.g., "clamps") onto the line. One example includes moving/ pushing against the line 14 until the clamp 32' actuates in an automatic manner to become attached, affixed, etc. to the line 14.

Figure 5:
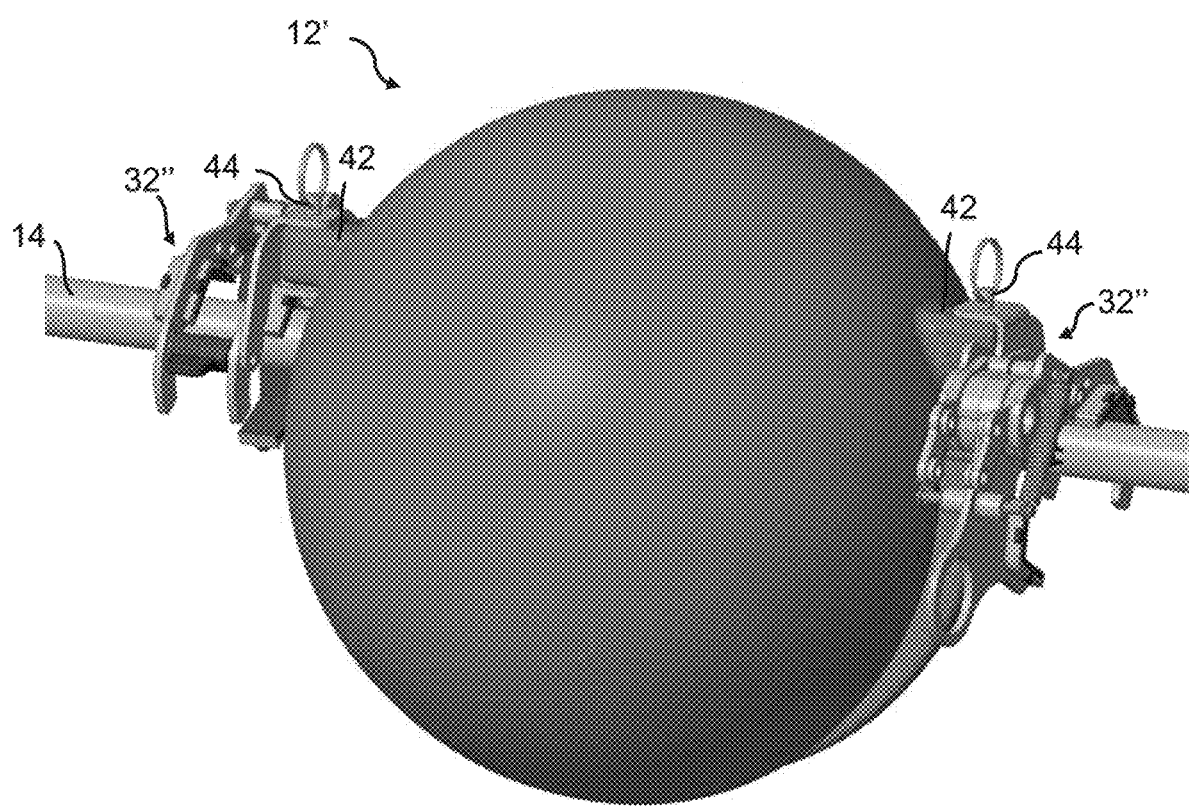
FIG. 5 is an illustration of an example item that is configured to be installed via pinning and showing an example of a pinning connection assembly at a location on a suspended line in accordance with at least one aspect of the present disclosure.
Figure 6:
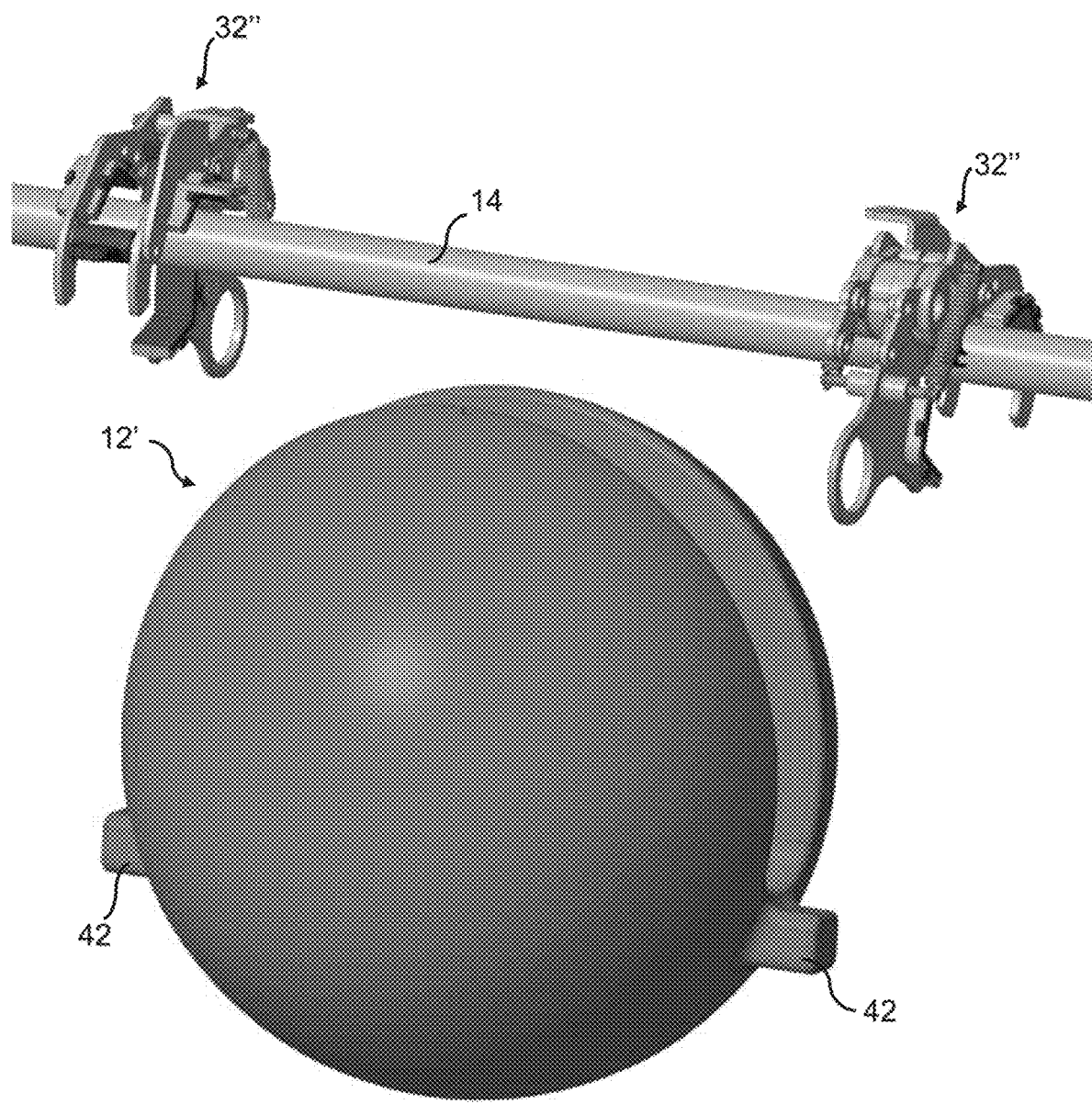
FIG. 6 is an illustration of the example item of FIG. 5, rotated/inverted, in a released, unpinned, condition in accordance with at least one aspect of the present disclosure.

As another example of variations that are within the scope of the present disclosure, the clamp/markerball interface could also be a pinned connection. See the example shown in FIGS. 5 and 6, with FIG. 5 showing the markerball 12' including protrusions 42 that are configured to engage and cooperate with pins 44 in coordination with actuation of clamps 32". Such may be considered a pinning action. FIG. 6 is an illustration of the example markerball 12' of FIG. 5, rotated/inverted, in a released, unpinned, condition. Briefly, when the markerball 12' is ready to be removed from the line 14, the pins 44 may be removed and the markerball may fall away from the line 14.

Figure 7:
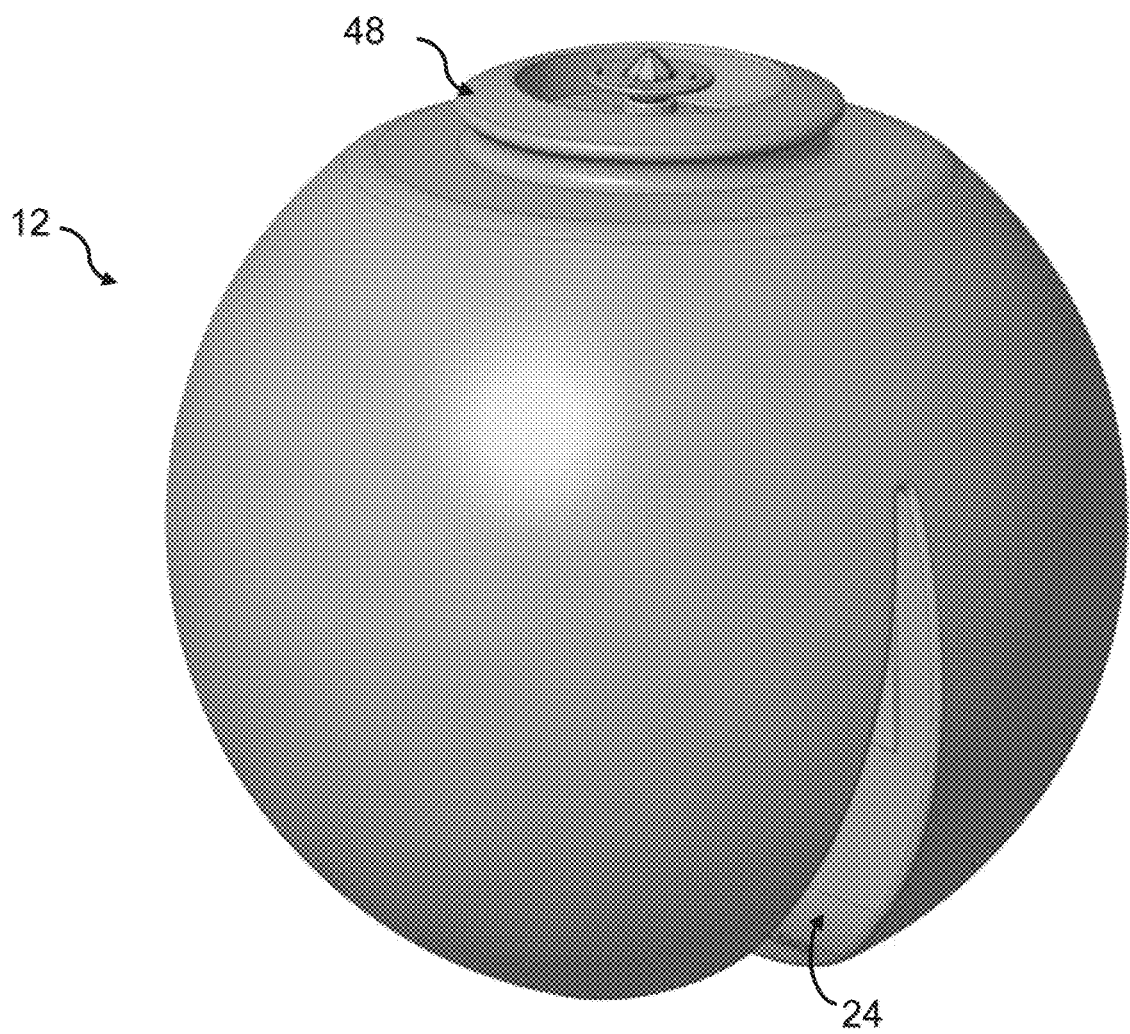
FIG. 7 is an inverted illustration of an example item that receives installation at a location on a suspended line and showing a support point for engagement and lifting by a drone in accordance with at least one aspect of the present disclosure.

As mentioned, FIG. 1 shows an example of the markerball 12 is installed to the top of the drone system 10. The mechanism for such securing may be varied. FIG. 7 shows an example of structure 48 upon the markerball that may be engaged and gripped by the drone system 10. Of course, different structures/different gripping arrangements are contemplated and within the scope of the present amendment. Again, as mentioned, it is to be appreciated that the markerball 12, and generally items to be installed upon the line 14, may be at a different location on the drone system 10. It is to be appreciated that the drone system 10 may have a construction/configuration for such different location on the drone system. One example is under the drone system. It could be designed so that once the ball clamps onto the line, the holding mechanism automatically disengages and releases the ball. It could also be a mechanical powered release mechanism that is controlled by the operator (e.g., line technician) of a remote control. Also, the drone system may be constructed/configured to hold/install more than one item (e.g., markerball).

Figure 8:
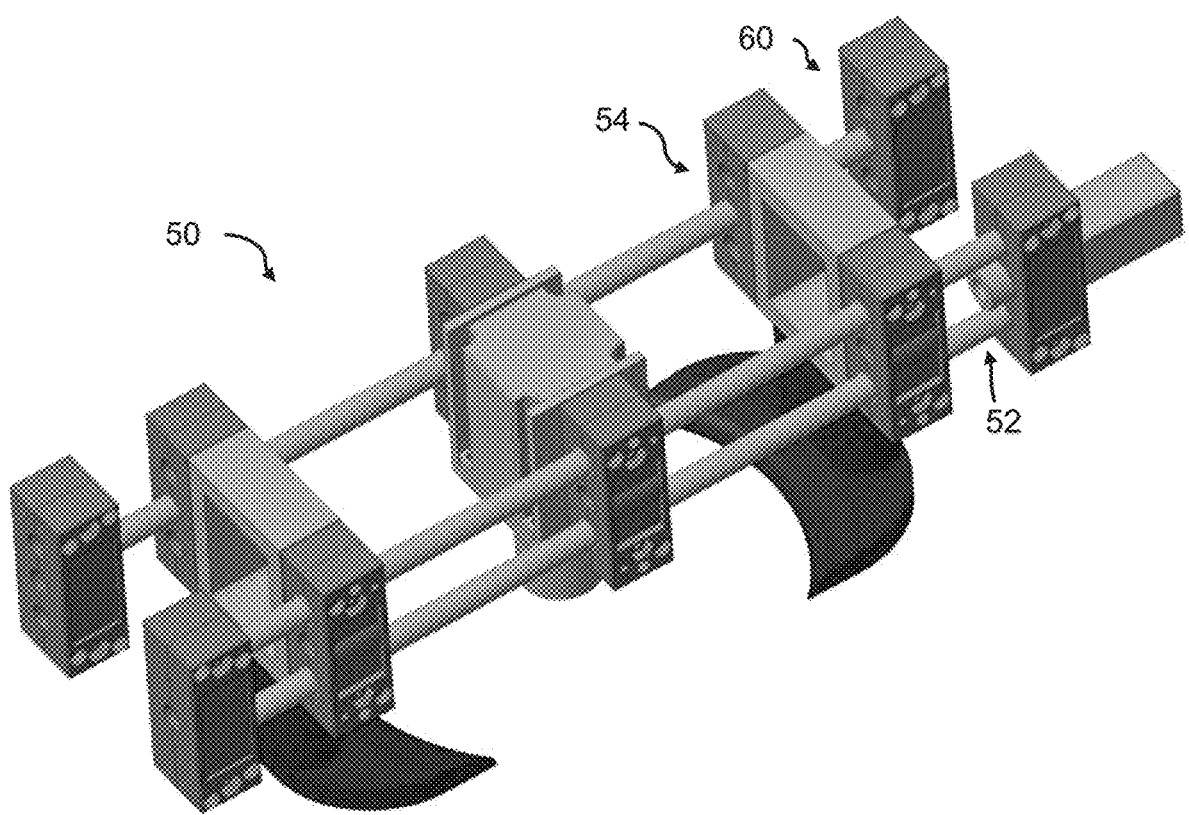
FIG. 8 is an illustration of an example drone bolt driver clamp mechanism in accordance with at least one aspect of the present disclosure.

Another style of item (e.g., markerball, not shown) could use a clamping mechanism 50 (see FIG. 8) that uses a bolt 52 driving a linkage system 54 that when tightened causes clamp jaws 60 to engage and tighten onto the line 14. Such a markerball could also have a top section that is designed to engage with a holding mechanism on the drone. The benefit of the bolt driven clamp is that it may be feasible to remove the markerball using a drone at a later date.

As mentioned, various items many be taken to the line and installed or similar. As some non-limiting examples, drone systems may be used to install fault indicator lights, line monitoring equipment, line markers, and other types of hardware that use a clamp-based method to attach to the line. Such would have similar drone support mechanisms to aid in the installations as the products listed above. It is to be appreciated that such is contemplated and within the scope of the present disclosure.

As still further aspects that are within the scope of the present disclosure, it is appreciated that drone systems may install example items via bolted installation at a location on a suspended line, the drone is accompanied within the arrangement by a portion for actuating a bolt to install an item upon the line. See FIG. 9 for an example of a drone system 110 that includes a portion 112 for actuating a bolt 120. Specifically, the shown example portion 112 is an impact driver 112. It is to be noted that within the shown example, the driver 112 is a hand tool driver.

It is to be appreciated that the drone system 110 has one or more propellers (not shown to reduce clutter). The drone system 110 includes structure 124 for holding/positioning the hand tool driver 112. Use of a readily available hand tool driver 112 may alleviate the need for a specially constructed driver. However, such a specially constructed driver is contemplated and within the scope of the present disclosure. As such, it is to be appreciated that the portion for actuating a bolt may be varied. Such variations are contemplated and are within the scope of the present disclosure.

Figure 9:
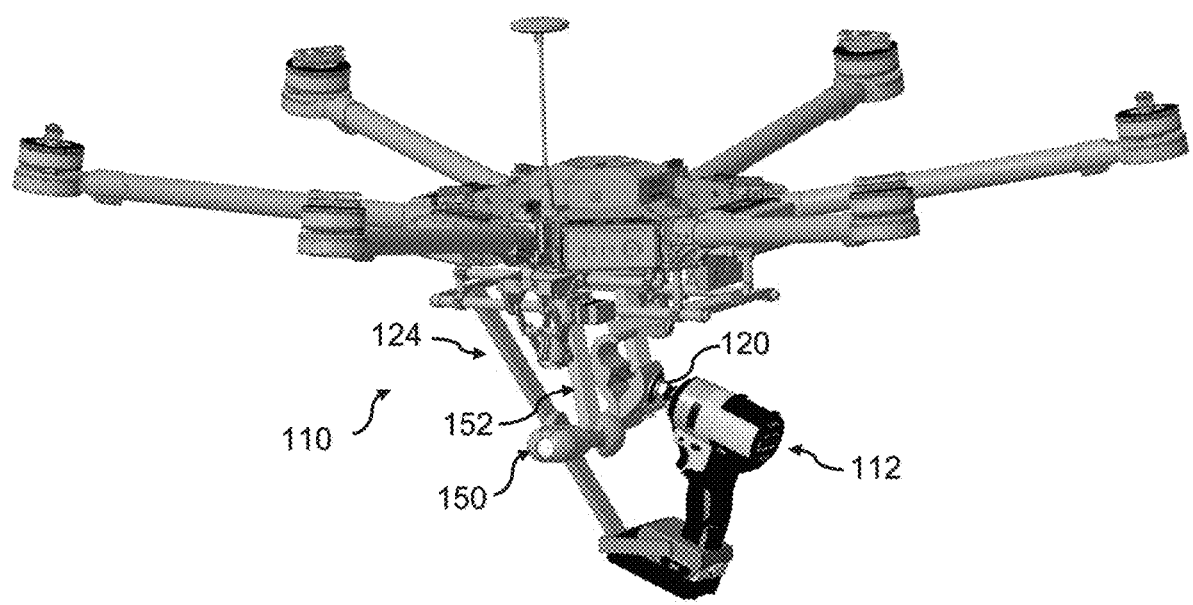
FIG. 9 is an illustration of an arrangement, including a drone, for bolted installation of an example item at a location on a suspended line in accordance with at least one aspect of the present disclosure.
Figure 10:
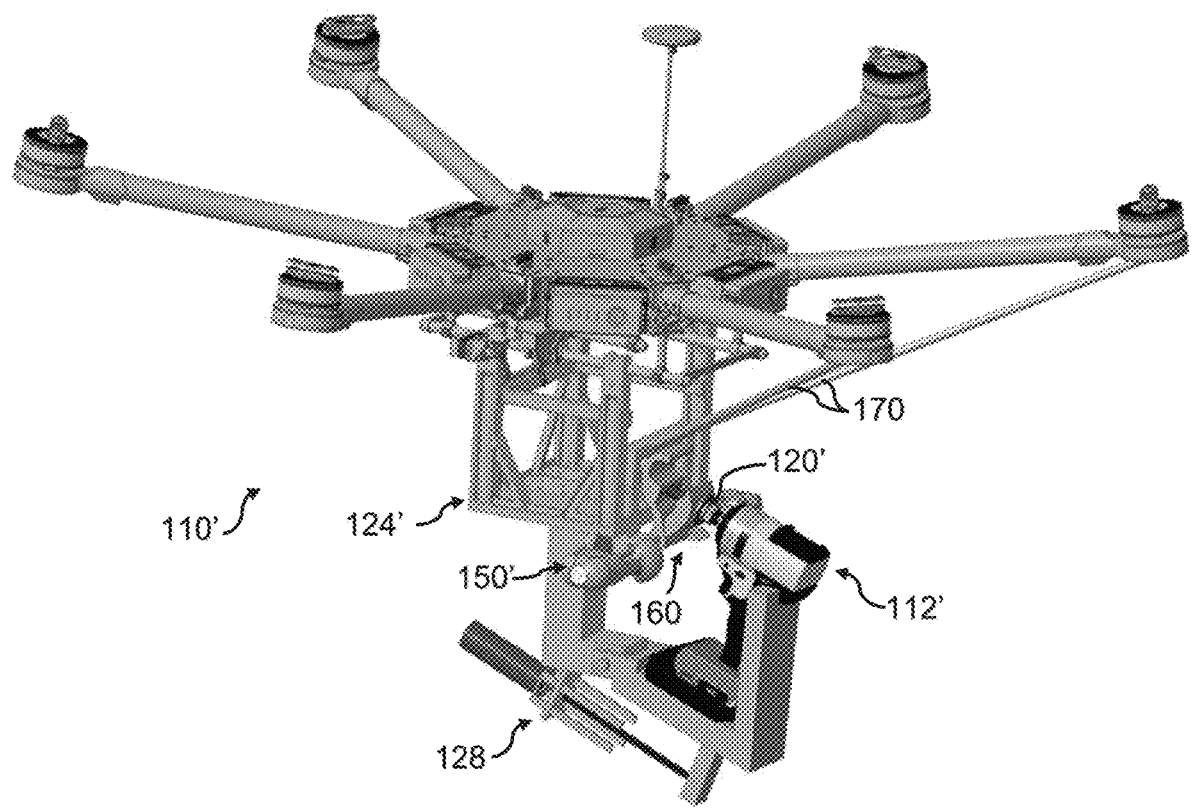
FIG. 10 is an illustration of an arrangement, including a drone, for bolted installation of an example item at a location on a suspended line in accordance with at least one aspect of the present disclosure.
Figure 11:
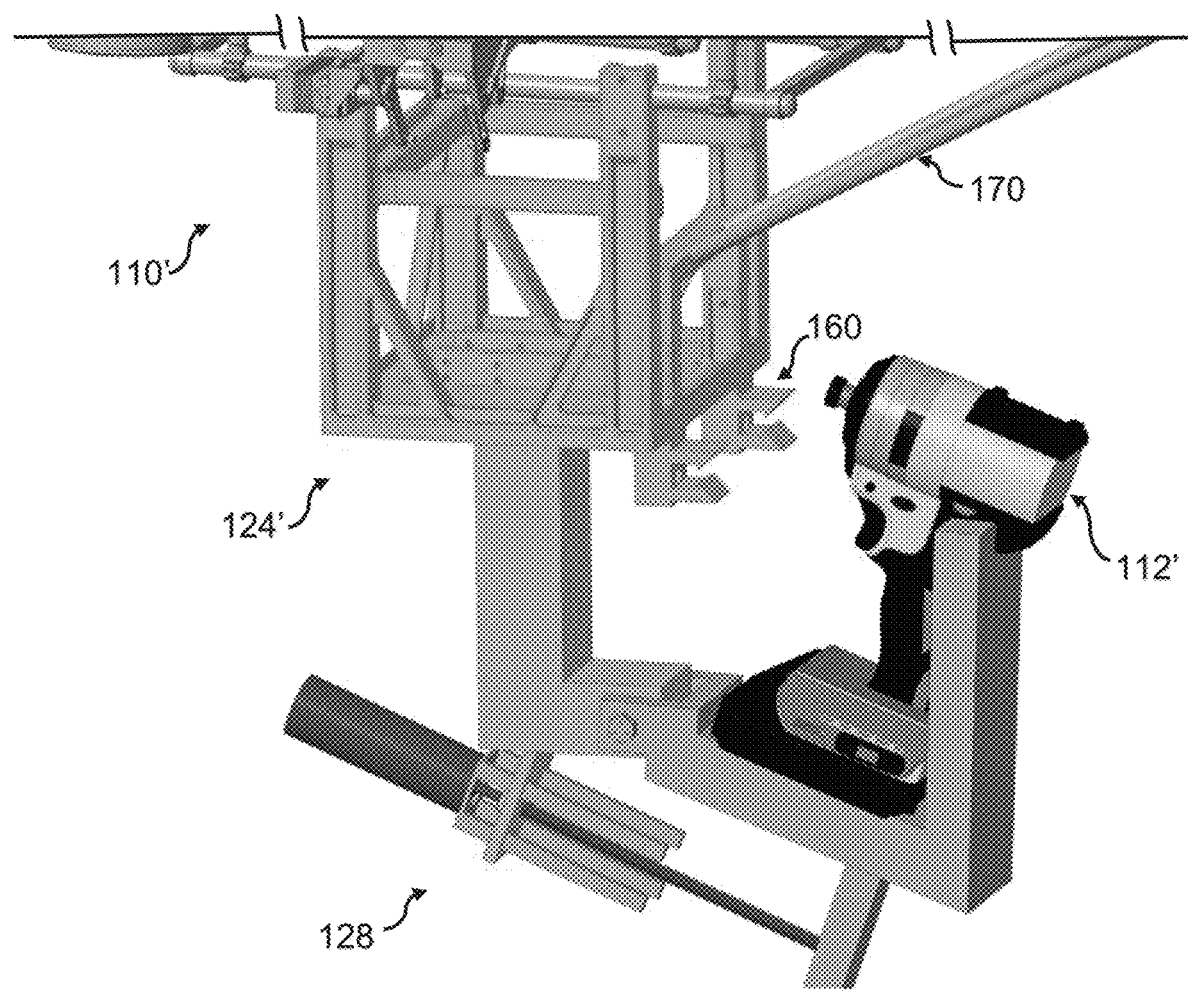
FIG. 11 is an enlarged illustration of a portion of the arrangement of FIG. 10 in accordance with at least one aspect of the present disclosure.
Figure 12:
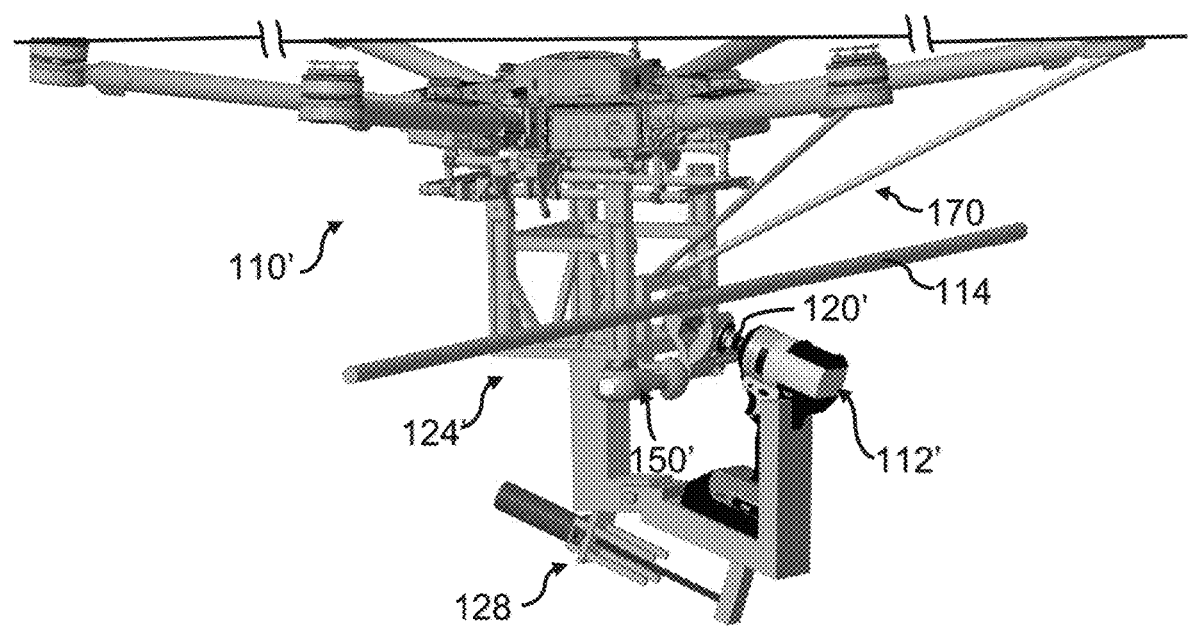
FIG. 12 is an illustration similar to FIG. 11 and shows an item that is about to be installed on the line in accordance with at least one aspect of the present disclosure.

Within the example of FIG. 9, a damper 150 is an example item that is for installation upon the line. The drone system 110 includes structure 152 for holding the damper 150 during lifting. Mover, the drone system 110 may include structure for guiding the damper 150 into engagement/location to the line.

Again, it is to be appreciated that variations are contemplated and within the scope of the present disclosure. FIGS. 10-14 show another example drone system 110' for bolted installation at a location on a suspended line 114. Moreover, the series of FIGS. 10-14 show an example method of using the example drone system 110' for bolted installation at a location on the suspended line 114.

It is to be appreciated that the drone system 110', has one or more propellers (not shown to reduce clutter). As such, the drone system 110' is for levitation of the system to the location on the line 114. The drone system 110' includes a portion for actuating a bolt 120' to install an item 150' upon the line 114. Within specifics of the example, the item 150' is a line damper 150'.

Within the shown example, a rotational driver assembly (e.g., a hand tool impact gun assembly) 112' is provided and such is used to tighten a clamp bolt 120' on the line 114. Such may be remotely controlled by a remotely-located pilot (e.g., located on the ground). Such may also be an automated actuation circuit with additional sensors.

The drone system 110' includes structure 124' for holding/positioning the hand tool driver 112'. A gear motor/drive screw 128 may be provided as part of the holding/positioning structure 124' to control the movement (rotation angle) of the rotational driver assembly 112'.

Of course, other constructions/configurations and/or components may be provided on the drone system 110'. As one example of an additional component, an item (i.e., damper 150') holding structure 160 may be provided. Within the shown example, the holding structure 160 includes two resilient arms extend outward to hold the damper 150' during installation or removal of the damper. It is to be appreciated that variations are possible. For example, the holding structure 160 could also be mechanized in other embodiments. Within FIG. 12, the damper 150' being held in place, ready to be installed. The line 114 is very near to the damper 150'.

As one example of an additional component, two top guide rods 170 may be provided. The two top guide rods 170 help guide the line relative to a clamp jaw for the damper 150'. Once correctly positioned, the driver 112' will activate and tighten the clamp bolt 120' to the correct torque.

Figure 13:
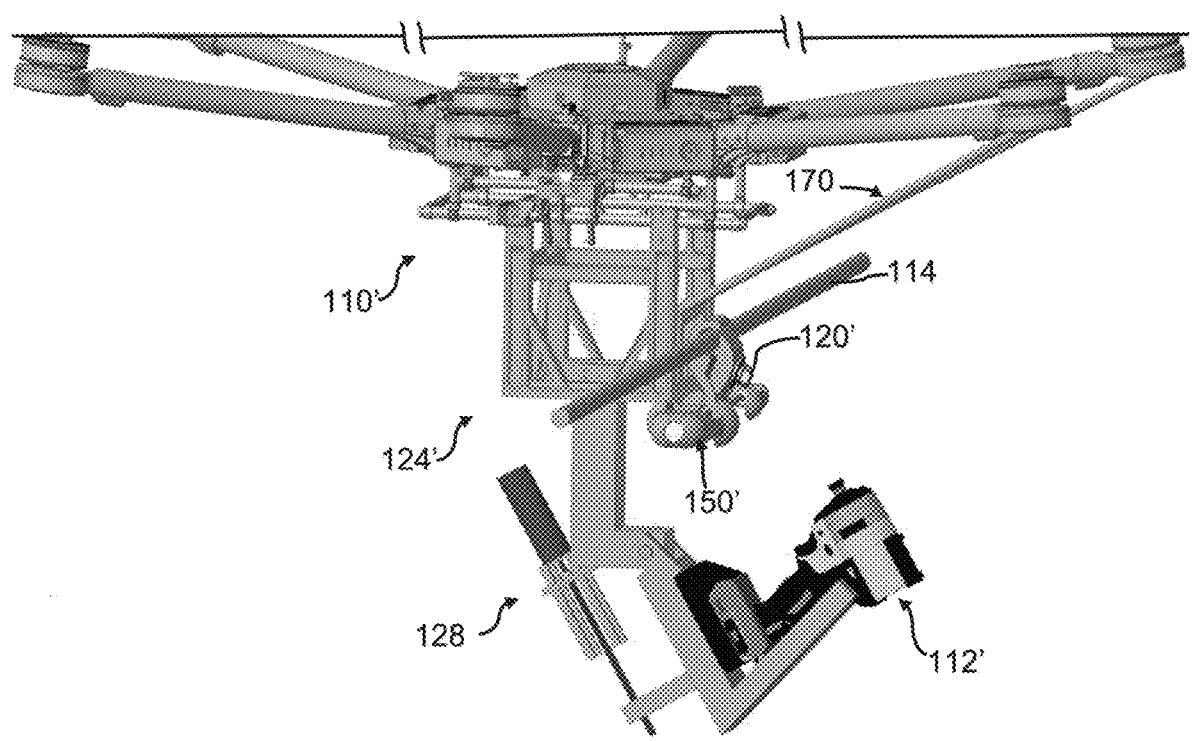
FIG. 13 is an illustration similar to FIG. 12 and shows the item installed on the line in accordance with at least one aspect of the present disclosure.

Within FIG. 13, the clamp of the damper 150' has already been tightened onto the line. The gear motor/drive screw 128 has been used to rotate the driver 112', out of the way of the damper 150'. The drone system 110' is now ready to fly in a direction (e.g., backward as viewed in FIG. 13) to disengage from the damper 150'.

Figure 14:
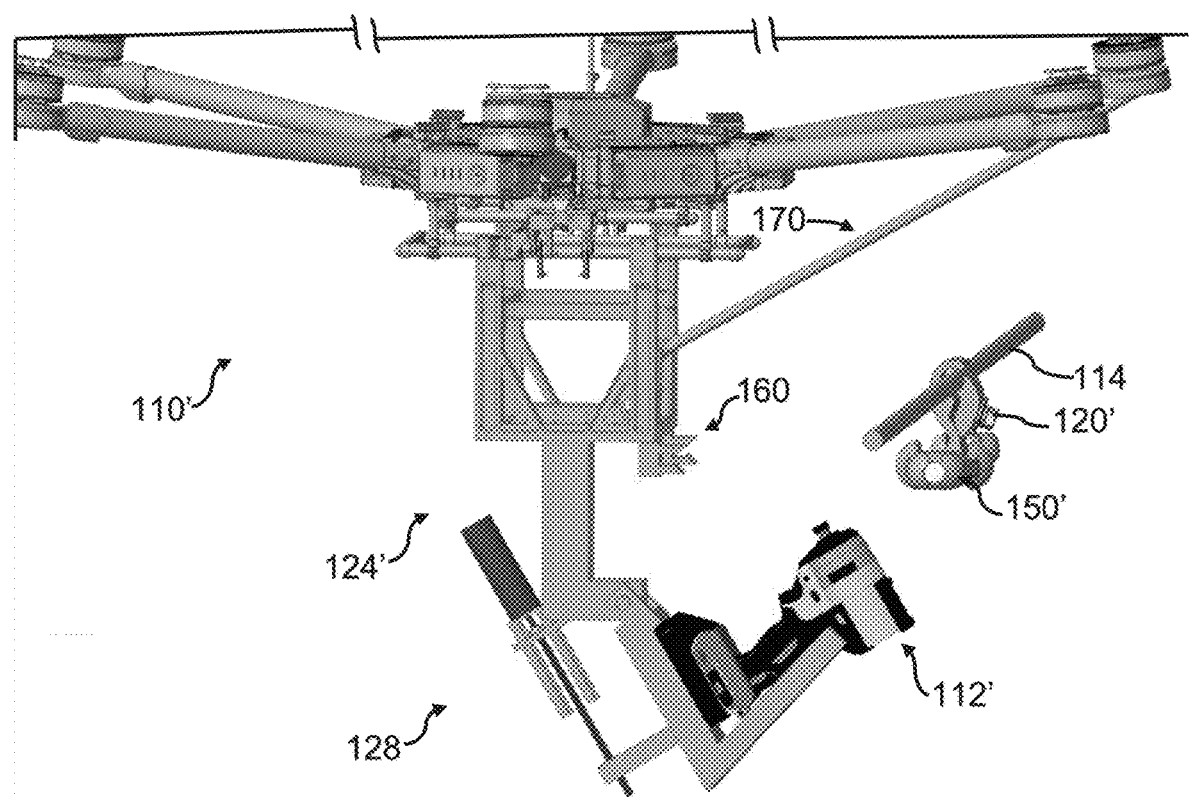
FIG. 14 is an illustration similar to FIG. 13, with the item installed on the line and the drone leaving the location on the line in accordance with at least one aspect of the present disclosure.

Within FIG. 14, the damper 150' has been disengaged from the drone system 110' and is now fully installed on the line 114. The drone system 110' is ready to land and pick up another damper (or other item) to repeat the process.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first location and a second location correspond to location A and location B or two different or two identical locations or the same location.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above-described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. An arrangement for mechanical installation of a markerball, having a slot extending to a center bisection of the markerball, at a location on a line, the arrangement comprising:
   a holder for holding the markerball, with the slot opening upward, to be installed;
   two upwardly extending finger guides, aligned with the slot, to aid placement of the markerball to be installed relative to the line when the line is relatively directed by the two finger guides into the slot at the center bisection of the markerball during upward levitation of the arrangement;
   a clamp portion, located adjacent to the slot at the center bisection of the markerball, for mechanical actuation, once the arrangement is upwardly levitated such that the line is in the slot at the center bisection of the markerball, to install the markerball upon the line at the location on the line; and
   a flying drone portion, having structure to lift the arrangement and the markerball, located below the clamp portion and with the two finger guides extending up above the flying drone portion to relatively direct the line while the flying drone portion remains below the line, for levitation of the markerball and the clamp portion to the location on the line.

2. The arrangement as set forth in claim 1, including a portion for moving the clamp portion.

3. The arrangement as set forth in claim 2, wherein the portion for moving the clamp portion includes a portion for closing the clamp portion.

4. The arrangement as set forth in claim 1, wherein the clamp portion for mechanical actuation includes structure for auto-actuation of the clamp portion.

5. The arrangement as set forth in claim 1, wherein the markerball includes structure to be engaged.

6. The arrangement as set forth in claim 1, wherein the markerball is spherical.

7. The arrangement as set forth in claim 1, wherein the two finger guides comprise rods.

8. The arrangement as set forth in claim 1, wherein the two finger guides create a v shape.

9. The arrangement as set forth in claim 1, wherein at least some of a first finger guide of the two finger guides is not parallel to at least some of a second finger guide of the two finger guides.

10. The arrangement as set forth in claim 1, wherein the clamp portion is spring-biased.

11. An arrangement for installation of a markerball and an associated spring-based clamp at a location on a line, the arrangement comprising:
    a holder for holding the markerball, with a slot opening upward, to be installed, and with the spring-based clamp located adjacent to the slot at a center bisection of the markerball;
    two upwardly extending finger guides, aligned with the slot, to aid placement of the markerball and the spring-based clamp relative to the line when the line is relatively directed by the two finger guides into the slot at the center bisection of the markerball during upward levitation of the arrangement;
    a portion for actuating the spring-based clamp to install the markerball and the spring-based clamp upon the line at the location once the arrangement is upwardly levitated such that the line is in the slot at the center bisection of the markerball; and
    a flying drone portion, located beneath the markerball and the spring-based clamp, for levitation of the portion to the location on the line, with the two finger guides extending up above the flying drone portion to relatively direct the line while the flying drone portion remains below the line, for levitation of the markerball and the spring-based clamp to the location on the line.

12. The arrangement as set forth in claim 11, wherein the portion for actuating the spring-based clamp includes structure for auto-actuation.

13. The arrangement as set forth in claim 11, wherein the markerball is spherical.

14. The arrangement as set forth in claim 11, wherein the two finger guides comprise rods.

15. The arrangement as set forth in claim 11, wherein the two finger guides create a v shape.

16. The arrangement as set forth in claim 11, wherein at least some of a first finger guide of the two finger guides is not parallel to at least some of a second finger guide of the two finger guides.

17. The arrangement as set forth in claim 11, wherein the spring-based clamp comprises at least one jaw to engage the line.

18. A method of mechanical installation of a markerball, having a slot extending to a center bisection of the markerball, at a location on a line, the method comprising:

holding, upon an arrangement, the markerball, with the slot opening upward, with the arrangement including two upwardly extending finger guides, aligned with the slot, to aid placement of the markerball to be installed relative to the line when the line is relatively directed by the two finger guides into the slot at the center bisection of the markerball during an upward levitation;

flying the arrangement with the held markerball, via operation of a flying drone portion of the arrangement, to levitate the arrangement, including the markerball located above the flying drone portion and the two finger guides extending up above the flying drone portion to relatively direct the line while the flying drone portion remains below the line, to the location on the line; and actuating a clamp portion, located adjacent to the slot at the center bisection of the markerball, of the arrangement, to close the clamp portion once the arrangement is upwardly levitated such that the line is in the slot at the center bisection of the markerball, to install the markerball upon the line at the location.

19. The method as set forth in claim 18, wherein closing the clamp portion comprises auto-actuation of the clamp portion.

20. The method as set forth in claim 18, wherein actuating a mechanical actuation portion comprises actuating a portion to close the clamp portion.

\* \* \* \* \*